United States Patent [19]

Little et al.

[11] Patent Number: 5,202,552

[45] Date of Patent: Apr. 13, 1993

[54] DATA WITH PERIMETER IDENTIFICATION TAG

[75] Inventors: Warren D. Little; Peter J. M. Baker, both of Victoria, Canada

[73] Assignee: MacMillan Bloedel Limited, Vancouver, Canada

[21] Appl. No.: 688,400

[22] Filed: Apr. 22, 1991

[51] Int. Cl.$^5$ .................. G06K 19/06; G06K 9/00
[52] U.S. Cl. ..................... 235/494; 235/454; 382/10
[58] Field of Search ............ 235/436, 454, 456, 470, 235/487, 494; 382/10

[56] References Cited

U.S. PATENT DOCUMENTS

| | | | |
|---|---|---|---|
| 3,409,760 | 11/1968 | Hamisch | 235/494 |
| 3,808,405 | 4/1974 | Johnson et al. | 235/494 |
| 4,004,131 | 1/1977 | Oneil, Jr. et al. | 235/494 |
| 4,667,089 | 5/1987 | Shirakabe et al. | 235/462 |
| 4,924,078 | 5/1990 | Sant'Anselmo et al. | 235/494 |
| 4,939,354 | 7/1990 | Priddy et al. | 235/494 X |
| 5,053,609 | 10/1991 | Priddy et al. | 235/494 X |
| 5,101,096 | 3/1992 | Ohyama et al. | 235/494 X |

FOREIGN PATENT DOCUMENTS

| | | | |
|---|---|---|---|
| 0405212 | 1/1991 | European Pat. Off. | 235/494 |
| 63-240688 | 10/1988 | Japan | 235/494 |
| 1-195589 | 8/1989 | Japan | 235/494 |
| 2-075091 | 3/1990 | Japan | 235/494 |
| 2-188894 | 7/1990 | Japan | 235/494 |
| 90/07162 | 6/1990 | World Int. Prop. O. | 235/494 |

*Primary Examiner*—John Shepperd
*Assistant Examiner*—Edward H. Sikorski
*Attorney, Agent, or Firm*—C. A. Rowley

[57] ABSTRACT

An identification or data tag composed of a central set of data cells surrounded by border cells which cooperate with their adjacent data cells by contrasting therewith to form a reference perimeter defined by the intersections of the boundaries of the border cells with their respective adjoining data cells.

18 Claims, 3 Drawing Sheets

DATA WITH PERIMETER IDENTIFICATION TAG

FIELD OF THE INVENTION

The present invention relates to an array tag. More particularly the present invention relates to a tag having a reference perimeter defined by contrasting data and border cells.

BACKGROUND OF THE INVENTION

The use of printed identification tags to code information that can be sensed by optic sensors is well known. Numerous tags have been designed for a number of different applications. Probably the most common of which is the bar code as used, for example, in grocery stores to identify packaged items.

It is also known to apply tags with specific coded information thereon and to use this coded information to control the movements of the coded article in accordance with the information coded on the tags, for example, this process is used to identify railway cars and sort them and is also used at some airports, for example, to direct luggage to its correct destination.

The tags may take any suitable form but it is essential that the tag reader be able to a) locate the tag in the image b) orient the tag in the image (assuming that it is randomly applied) and c) decode the tage which obviously requires a) and b) be performed. This process is made considerably more reliable when the perimeter or a reference perimeter of the tag is easily identified.

It is also important to permit as much information as possible to be coded into the space available on the tag.

One of the more common forms of the tag utilizes an array of cells set up in mutually perpendicular rows and columns and wherein the information is coded in each cell by one of a selected pair of contrasting colours, for example, black and white, so that the tag reader can then easily discriminate one type of cell from another and by using the binary system clearly identify what is coded therein.

U.S. Pat. No. 4,924,078 issued May 8, 1990 to Anselmo et al discloses a matrix type arrangement having internal data field surrounded by a border and an external data field around the border (the external data field may be eliminated if desired), while U.S. Pat. No. 4,939,354 issued Jul. 3, 1990 to Priddy discloses another machine readable binary coded tag format.

BRIEF DESCRIPTION OF THE PRESENT INVENTION

It is an object of the present invention to provide a tag containing coded data and complimentary border cells that define a reference perimeter.

The reference perimeter is an outstanding feature (i.e. easily identified) that facilitates locating a tag image.

Moreover, the tag of the present invention makes effective use of the tag area enabling more information to be encoded on a tag of given area or allows lower resolution (less expensive) tag readers for a given area tag or alternatively allows a given resolution reader to decode smaller tags with the same amount of information.

Broadly the present invention relates to a tag comprising a central set of data cells surrounded by a plurality of border cells which cooperate with adjoining of said data cells to define a reference perimeter for said tag, each of said data cells being one of a first set of cells each of which has a first identifying feature or one of a second set of cells each having a second identifying feature, each of said border cells being selected from the opposite set of said first and second sets of cells to that from which its respective said adjoining data cells was selected thereby to define a reference perimeter by the junction of said border cells and their respective adjoining data cells.

If desired, additional data may be encoded in cells on the side of said border cells remote from said central set of data cells.

The present invention also relates to a method of detecting the "perimeter" of a tag having cells containing a selected one of at least two different discriminating features to identify one cell from another comprising providing a video image of said tag formed by scan lines of pixels, processing pixels along said scan lines in said image to determine a gradient at the pixels delimiting one feature from another and defining a boarder between adjacent cells, determining if a line defined by adjacent boarders conforms with a preselected criteria and if so continue to process along said scan lines to find other sections of said preselected criteria and discover said perimeter of said tag, when an acceptable match is found between lines defined by said boarders of adjacent of said cells and said criteria said perimeter is established and said tag position and orientation is defined permitting decoding of a message coded on said tag.

Preferably said criteria will comprise a plurality of straight lines and preferably said straight lines will intersect to define corner of said perimeter.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
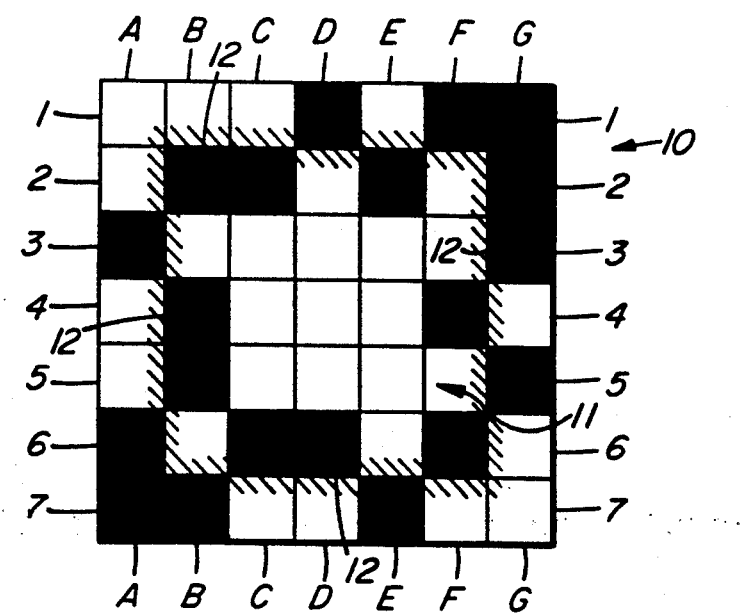
FIG. 1 is a plan view of a tag constructed in accordance with the present invention and containing border cells and central data cells.

The tag 10 of FIG. 1 is composed of mutually perpendicular rows 1, 2, 3, 4, 5, 6 and 7 and columns A, B, C, D, E, F, and G which define individual cells 1A, 1B, 1C, 2A, 2B, 2C, etc., that may be coded with one of at least two different distinguishable features. In the illustrated arrangement the distinguishing features are the colours white or black. The row 1 and 7 contain only border cells as do the columns A and G so that a central set 11 of coded data cells is defined by the cells contained within the corners 2B, 2F, 6B, and 6F.

A reference 'perimeter' 12 is indicated by hash lines extending therefrom on the white cells defining one side of the reference perimeter. The reference perimeter in the example is square and completely encircles the set of data cells 11. However the reference perimeter need only extend for a distance around the data cells sufficient to identify and orient the tag 10. For example, the reference perimeter may extend along two or more sides of the set of data cells 11 and need not extend the full length of these sides. In all cases there must be a sufficient length of the perimeter to identify and orient the tag. In most cases it is likely to include the set of data cells 11.

To define the reference perimeter 12 border cells in rows 1 and 7 and columns A and G are made to contrast with their respective adjoining data cell, for example, cell 2A is white since cell 2B is black and similarly cell 1B is white because cell 2B is black so that all the border cells around the reference perimeter 12 having a different designating feature to that of its respective adjoining data cell contained within the central set 11.

Figure 5:
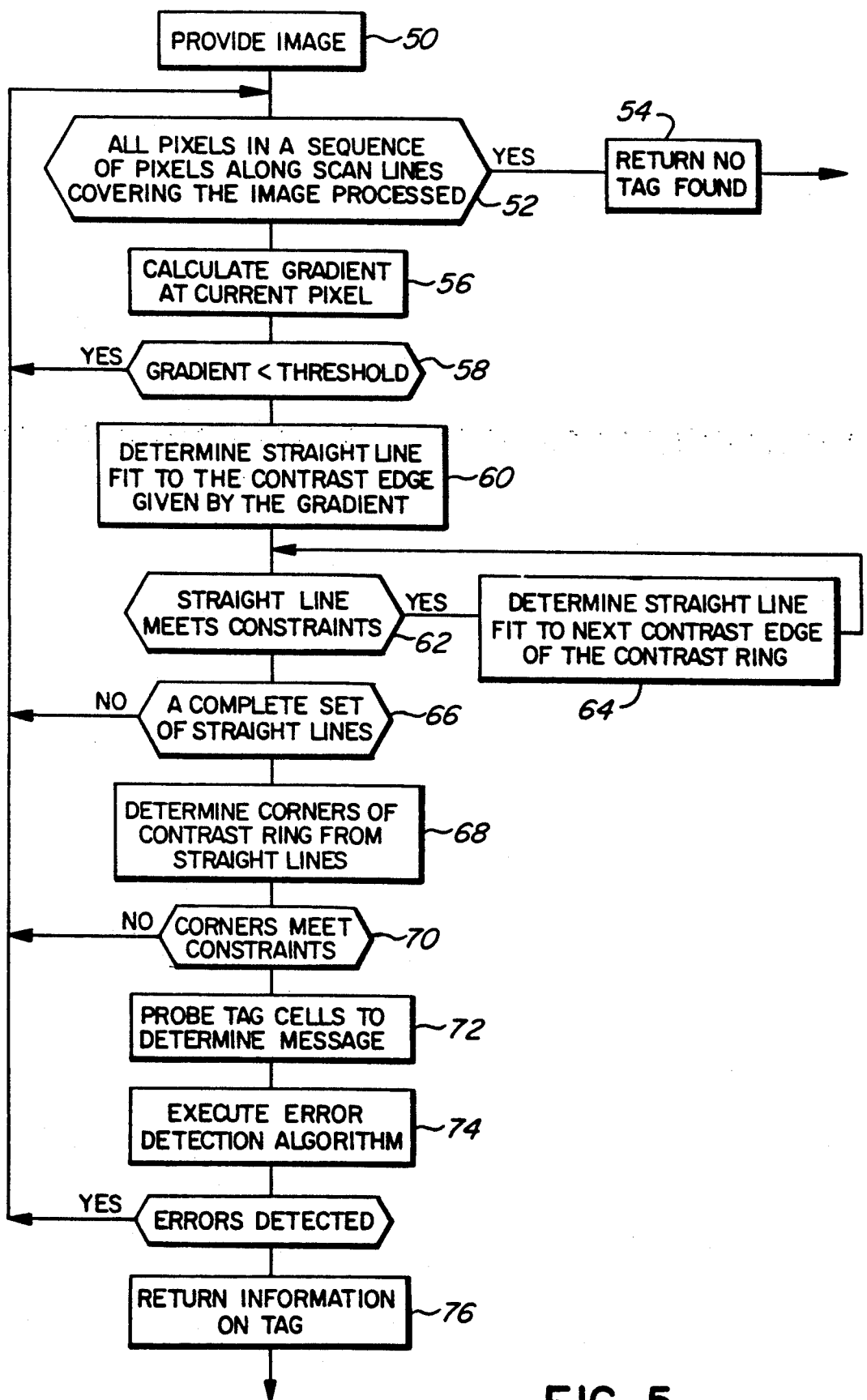
FIG. 5 is a flow diagram illustrating the operation of the computer of the tag reader reading a tag as illustrated in FIG. 1.

A tag reader 100 schematically illustrated in FIG. 5 can reliably distinguish the reference perimeter 12 by analyzing a video image of the tag 10 using well known edge detection techniques adapted to detect the lines of the reference perimeter 12. Once the reference perimeter has been determined, it is relatively straight forward to locate and to decode the data cells and/or border cells.

Figure 4:
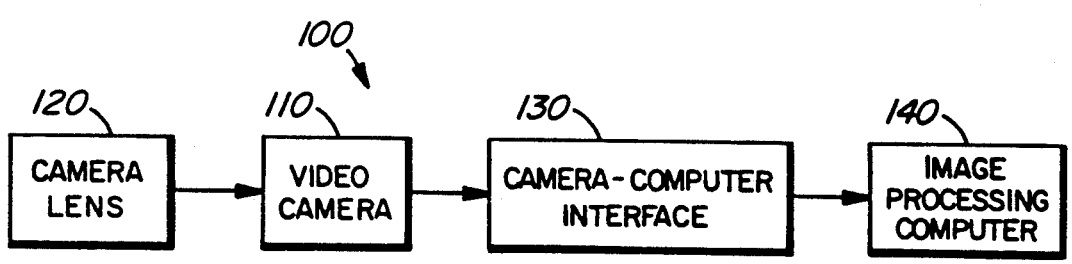
FIG. 4 is a schematic illustration of a reader for use with the tag of the present invention.

The array tag reader 100 generally consists of a 2D video camera 110 with a lens 120 interfaced through interface 130 with an image processing micro computer 140 as shown in FIG. 4. The image processing algorithm executed by the micro computer would generally follow the sequence of operation shown in FIG. 5.

As illustrated in FIG. 5 an image is provided as indicated at 50 by a video camera or the like. The computer analyzes the video image and processes all pixels in a sequence of pixels along selected scan lines covering the image as indicated at 52. If all pixels have been processed and no tag has been found this fact is returned as indicated at 54 to the main program. If more pixels remain to be processed the gradient is calculated at the current pixel as indicated at 56 and if the gradient in any direction exceeds a certain threshold as indicated at 58 then a straight line fit to the contrast edge defined by the gradient is determined as indicated at 60. The straight line is then compared to see if it meets the constraints previously programmed into the system as indicated at 62 and the straight line fit to the next contrast edge is then determined as indicated at 64 if constraints as viewed at 62 are met. Once a complete set of straight lines is obtained as indicated at 66, the corners of the set of straight lines determined at 66 are determined as indicated at 68 and compared with the preprogrammed constraints for the tag. If the corners are properly identified they define the perimeter of the tag and the tag cells are probed to determine the coded message as indicated at 72 and assuming an error detection method is programmed, it is applied to the detected message as indicated at 74. If no error is detected the information on the tag is delivered the mainline program as indicated at 76.

The algorithm searches along scan lines until a sufficiently large gradient (in any direction) defines an edge in the image. The algorithm then steps along the edge to fine the longest straight line that fits the edge to within a specified tolerance. The algorithm continues to step around the edge to determine a set of straight lines that approximate a fit to the edge. If the set of straight lines meet the constraints of the tag perimeter the intersections of the straight lines are determined and used to define the corners of the perimeter and thereby the location and orientation of the tag so the tag may be analyzed and decoded.

The term gradient means a mathematical vector that gives the magnitude and direction of a surface as is normally used to determine edges in an image and the contrast ring referred to in the above program is the reference perimeter 12.

Figure 2:
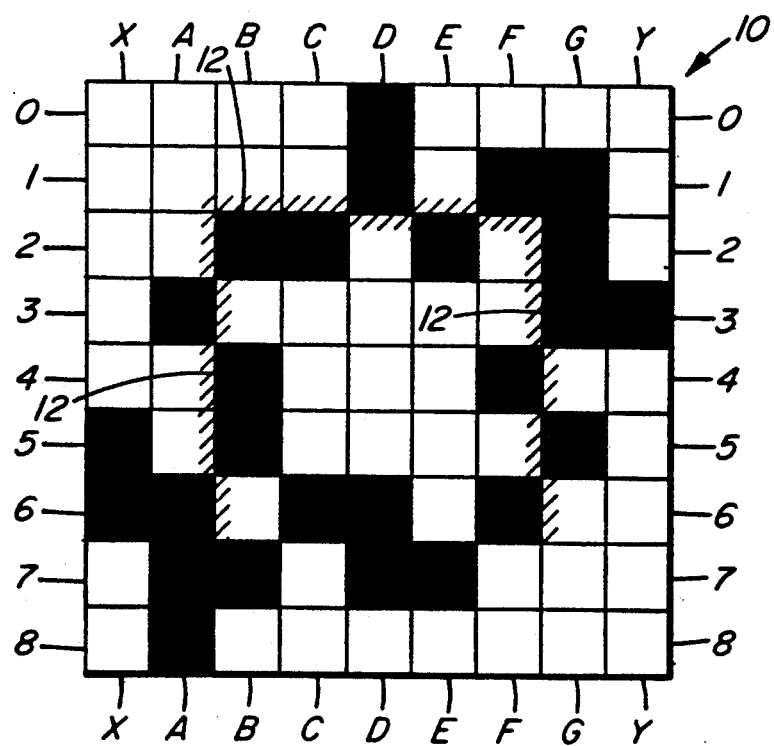
FIG. 2 is a view similar to FIG. 1 showing a tag with further data cells outside of the border cells.
Figure 3:
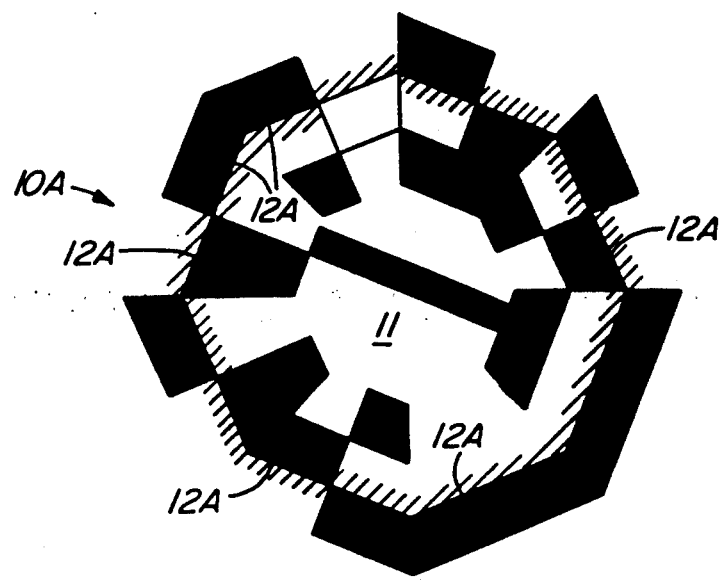
FIG. 3 illustrates a octagon shaped tag incorporating the present invention.

It is also possible, if desired, to provide further data cells on the outside of the border cells as shown for example in FIG. 2 where row 0 and 8 and columns X and Y are outside of the border cells and may be used to contain further data. In this case it is important that there not be confusion between the reference perimeter 12 and the periphery formed by the border cells and their adjacent outside data cells, i.e. the cells contained in rows 0 and 8 and columns X and Y should not be arranged in the same manner, i.e. to contrast with the border cells around the periphery and define a second reference periphery which would impede identification of the proper reference perimeter.

The reference perimeter 12 in FIG. 2 also only extends around three sides of the set of data cells 11. The cell 7D in the illustration does not contrast with the adjoining data cell 6D to define the perimeter but instead is used to code data, i.e. the whole row 7 may be used solely to code data if desired with the perimeter 12 being defined by an inverted U-shape.

Various constants such as length and shape of the image reference perimeter 12 and the use of special codes such as cyclic redundancy check codes (CRC) may be used to differentiate the reference perimeter or coded data from false information.

Only one row and column of data cells has been shown surrounding the border cells in FIG. 2, however further rows and columns may also be provided if desired but it is generally preferred to maintain the reference perimeter 12 close to the actual outer periphery of the data contained within the tag.

In the illustrated arrangement the cells are all rectangular (square) and are either completely white or completely black so that the edges of adjoining border and data cells define straight edges with a large contrast on opposite sides of the edges. Other shapes such as octagonal tag 10A with the reference perimeter 12A defined in the same manner as the perimeter 12 (i.e. junction of contrasting boarder edges) are practical, similarly the tag itself or the reference perimeter 12 may be a shape other than rectangle. The use of a tag with an octagonal perimeter has an advantage where the tag is to be applied to the end of a cylindrical object such as a log as it increases the size or area of the tag that may be used for a give diameter object.

Having described the invention, modifications will be evident to those skilled in the art without departing from the spirit of the invention as defined in the appended claims.

We claim:

1. A data tag comprising means defining a tag structure including a body means having machine readable indicia providing a plurality of data cells and a plurality of border cells defining a cell arrangement, said border cells being on the side of said data cells remote from a central portion of said cell arrangement and cooperating with adjoining of said data cells to define a reference perimeter for said tag, said perimeter extending along at least 2 abutting sides of said data cells, each of said data cells being one of a first set of cells each of which has a first identifying feature or one of a second set of cells each having a second identifying feature clearly distinguishable from the first identifying feature, each of said border cells being selected from the opposite set of said first and second sets of cells to that from which its respective said adjoining data cell was selected thereby to define said reference perimeter by the junction of said border cells and their respective adjoining data cells.

2. A data tag as defined in claim 1 wherein said first distinguishing feature or said second distinguishing feature covers substantially the complete area of each cell bearing that respective distinguishing feature.

3. A data tag as defined in claim 1 further comprising additional data cells on the side of said border cells remote from said central portion.

4. A data tag as defined in claim 3 wherein said first distinguishing feature or said second distinguishing feature covers substantially the complete area of each cell bearing that respective distinguishing feature.

5. A data tag as defined in claim 1 wherein said perimeter encircles said portion.

6. A data tag as defined in claim 5 wherein said first distinguishing feature or said second distinguishing feature covers substantially the complete area of each cell bearing that respective distinguishing feature.

7. A data tag as defined in claim 5 wherein said data and border cells are substantially rectangular.

8. A data tag as defined in claim 7 wherein said first distinguishing feature or said second distinguishing feature covers substantially the complete area of each cell bearing that respective distinguishing feature.

9. A data tag as defined in claim 5 further comprising additional data cells on the side of said border cells remote from said central set of data cells.

10. A data tag as defined in claim 9 wherein said first distinguishing feature or said second distinguishing feature covers substantially the complete area of each cell bearing that respective distinguishing feature.

11. A data tag as defined in claim 5 wherein said perimeter is substantially polygonal.

12. A data tag as defined in claim 11 wherein said perimeter is substantially rectangular.

13. A data tag as defined in claim 11 wherein said perimeter is substantially octagonal.

14. A data tag as defined in claim 1 wherein said data and border cells are substantially rectangular.

15. A data tag as defined in claim 14 wherein said first distinguishing feature or said second distinguishing feature covers substantially the complete area of each cell bearing the respective distinguishing feature.

16. A data tag as defined in claim 14 wherein said data and border cells are essentially square.

17. A method of detecting a reference perimeter of a data containing tag having data and border cells each identified by a selected one of at least two different discriminating features, each said border cell having a distinguishing feature selected from said at least two different discriminating features different from the discriminating feature of its adjoining data cell to form said reference periphery of said data containing tag along the junctions of said border cells with their respective adjoining data cells comprising providing a video image of said tag formed by scan lines of pixels, processing pixels along said scan lines in said image to find a gradient at a pixel delimiting one from another of said discriminating features and defining a cell border between adjacent of said cells, determining if a line defined by cell borders conforms with a preselected criteria and if not continue to process along said scan lines to find further said gradient, if so continue to process to find other sections of said preselected criteria and find said perimeter of said tag, when an acceptable match is found between lines defined by said cell borders and said criteria said perimeter is established and said tag position and orientation is defined, and then decoding a message coded on said tag.

18. A method as defined in claim 1 wherein said criteria comprises at least two straight lines intersecting at a corner.

* * * * *